United States Patent [19]

Fleisher et al.

[11] 4,175,630
[45] Nov. 27, 1979

[54] MOTORIZED BICYCLE WITH REMOVABLE FUEL TANK

[76] Inventors: Seymour Fleisher, 9 Kirkbride Ter., Towaco, N.J. 07082; Warner Rosenschein, 19 Truman Blvd., Oakland, N.J. 07436

[21] Appl. No.: 857,017

[22] Filed: Dec. 2, 1977

[51] Int. Cl.² .................. B62D 27/06; F02B 77/08
[52] U.S. Cl. ............................ 180/225; 123/198 D; 180/221; 280/5 A
[58] Field of Search .............. 180/33 R, 33 D, 33 C, 180/31, 35; 280/5 A, 5 R; 220/17, 86 R, 408, 400, 70, 409, 410, 401; 123/198 D; 251/144; 137/209, 377; 222/185, 325, 509; 141/346

[56] References Cited

U.S. PATENT DOCUMENTS

| 688,838 | 12/1901 | Dorsey | 180/33 D |
|---|---|---|---|
| 1,831,028 | 11/1931 | Olson | 222/325 |
| 2,583,499 | 1/1952 | Teegen | 180/33 D |
| 2,696,272 | 12/1954 | Schlaphoff | 180/33 R |
| 3,342,281 | 9/1967 | Elia | 180/33 D |
| 3,512,795 | 5/1970 | Naeve | 280/5 A |
| 3,893,678 | 7/1975 | Engdahl | 280/5 A |
| 3,903,980 | 9/1975 | Darras | 180/31 |

FOREIGN PATENT DOCUMENTS

| 53604 | 9/1937 | Denmark | 180/33 D |
|---|---|---|---|
| 2228685 | 6/1974 | France | 220/86 R |

*Primary Examiner*—Albert J. Makay
*Assistant Examiner*—Edmond G. Rishell, Jr.
*Attorney, Agent, or Firm*—Berman, Aisenberg & Platt

[57] ABSTRACT

A motorized bicycle which features a removable fuel tank. The fuel tank may be selectively secured within a housing mounted on the frame of the bicycle. The housing and tank include means which cooperate upon insertion of the fuel tank to permit fuel to flow from the tank to the fuel line for the engine of the bicycle. Removal of the tank from the housing automatically seals the tank against spillage of fuel and permits the bicycle to be safely transported. The fuel tank also features an air vent which is automatically opened when the tank is secured in the housing.

12 Claims, 4 Drawing Figures

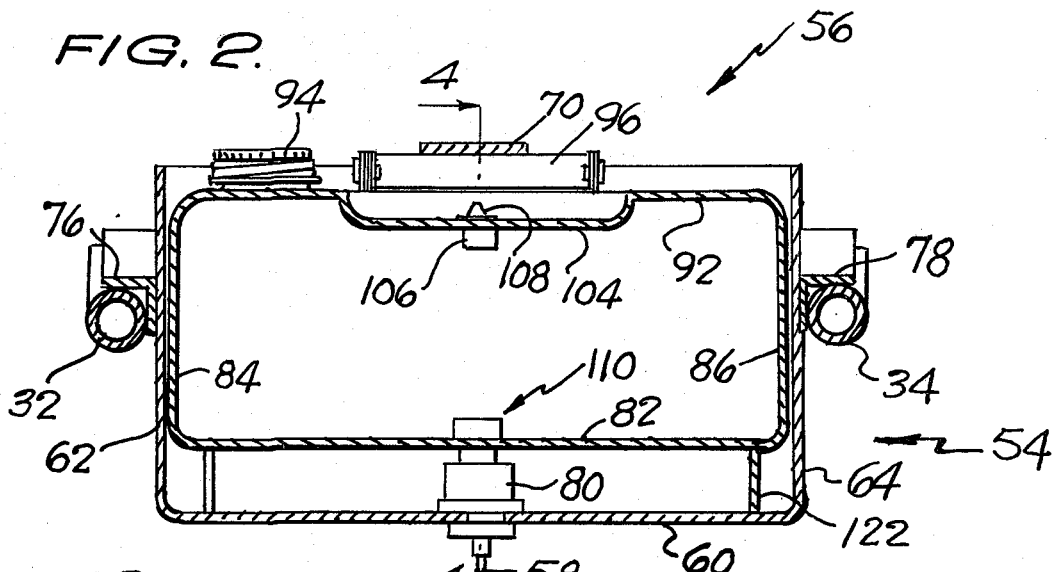
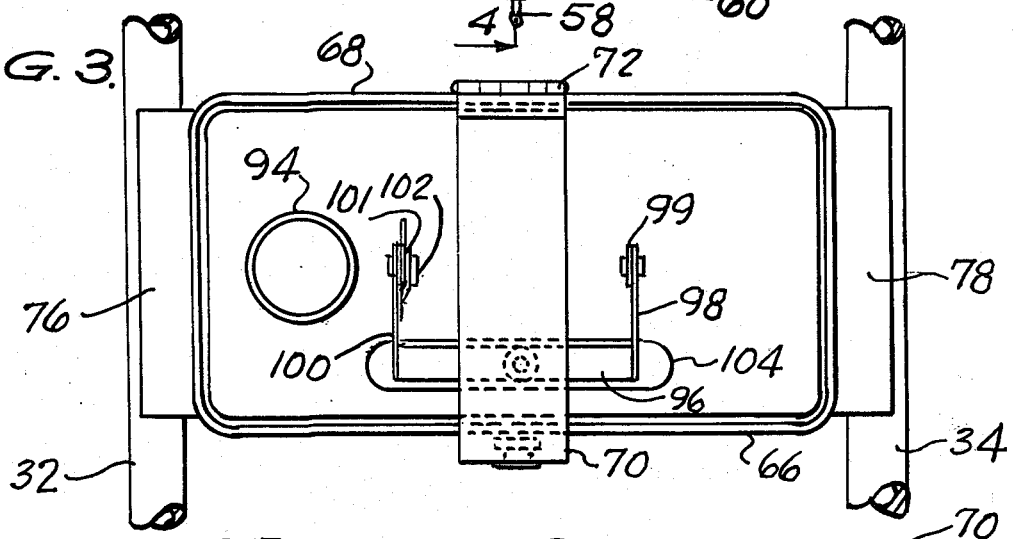
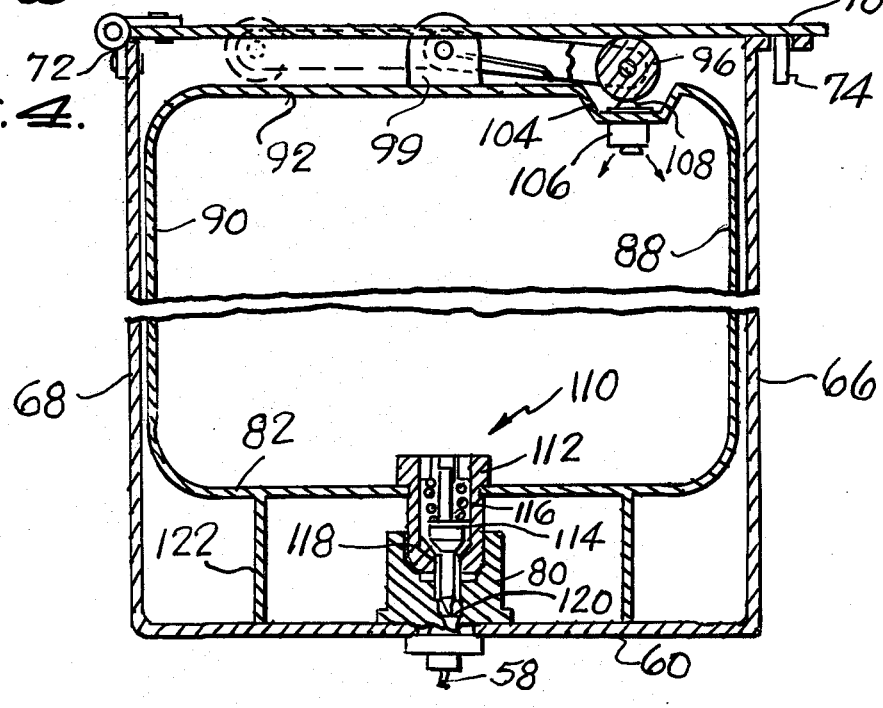

MOTORIZED BICYCLE WITH REMOVABLE FUEL TANK

BACKGROUND OF THE INVENTION

1. Field of the Invention

The present invention is related to motorized bicycles and, more particularly, is directed towards a motorized bicycle which features a removable fuel tank.

2. Description of the Prior Art

U.S. Pat. No. 3,342,281 to Elia sets forth a bicycle frame which is made collapsible by means of a hinged connection. An engine is also connected to the frame and drives a rotary member which comes into contact with the rear wheel of the bicycle so as to drive same. The gasoline tank for the engine is bolted to the bushing of the frame. While the collapsible feature of the Elia bicycle reduces the bulk of the vehicle and thus renders same susceptible of being stored in a restricted space, permanent attachment of the fuel tank may make such storage hazardous under certain conditions. For prolonged storage or transport of the folded bicycle, the fuel tank of Elia would have to be emptied prior to such transport or storage, which is both troublesome and wasteful of fuel. If the fuel tank is not completely emptied prior to transport or storage, the danger of accidental combustion remains, and transportation of the bicycle on, for example, common carriers would be severely restricted.

It therefore may be appreciated that it would be extremely desirable to provide a collapsible, portable motorized bicycle with means for separating the fuel source from the motor during transport or storage so as to minimize the danger and to maximize safety.

Other pertinent United States patent in this general art area of which I am aware include: U.S. Pat. Nos. 3,903,980; 2,696,272; 2,583,499; and 688,838.

OBJECTS AND SUMMARY OF THE INVENTION

It is therefore a primary object of the present invention to provide a collapsible motorized bicycle with a fuel system that features a removable fuel tank for facilitating transport and storage of the bicycle under maximum safety conditions.

An additional object of the present invention is to provide a motor driven vehicle, such as a bicycle, with a removable fuel tank which automatically cuts off the fuel flow therefrom when removed from the motor vehicle.

A still further object of the present invention is to provide a fuel tank structure for use with a motor vehicle which features automatic air and fuel valves which are actuated only upon proper insertion of the fuel tank into the vehicle.

The foregoing and other objects are attained in accordance with one aspect of the present invention through the provision of a motorized bicycle having a frame, a gasoline motor mounted on the frame, a drive spool rotated by the motor, and a clutch for selectively engaging the drive spool with a wheel of the vehicle. In combination with such motorized bicycle is an improved gasoline tank which is selectively removable from the bicycle and a housing mounted on the frame for selectively retaining or releasing the gasoline tank. More particularly, the housing has a fuel line extending therefrom to the gasoline motor, and means for placing the fuel line in fluid communication with the gasoline tank. The gasoline tank includes a fuel exit passage formed in the lower portion thereof for delivering fuel from the tank to the fuel line, and means positioned in the fuel exit passage for permitting fuel flow therethrough only upon the proper positioning of the tank in the housing.

In accordance with yet other aspects of the present invention, the means for permitting fuel flow through the fuel exit passage comprises a normally closed valve which opens upon mating with the means for placing the fuel line in fluid communication with the gasoline tank. The normally closed valve more particularly comprises a valve housing having a valve seat, a movable plunger positioned within the valve housing, and a spring for biasing the plunger towards the valve seat. The means for placing the fuel line in fluid communication with the gasoline tank comprises an actuating shaft which is fixedly positioned in the lower portion of the housing for moving the plunger away from the valve seat when the tank is positioned within the housing. A base support member extends downwardly from the bottom wall of the gasoline tank for peripherally enclosing the valve to prevent accidental actuation thereof.

In accordance with yet other aspects of the present invention, the gasoline tank further includes a normally closed air vent valve positioned in the top wall thereof, and means for automatically opening the air vent valve when the tank is secured in the housing. The last-named means comprises a lever in the form of a carrying handle for the gasoline tank which is pivotally mounted to the top wall of the tank, and a tank retaining cover pivotally mounted on the housing for securing the handle against the air vent valve when closed while retaining the tank in the housing. A spring is provided for normally biasing the handle out of engagement with the air vent valve.

In accordance with a broader aspect of the present invention, there is provided in combination with an engine driven vehicle a unitary gasoline tank having a fuel exit passage and being readily separable from the vehicle and which includes means for automatically sealing the fuel exit passage when removed from the vehicle. The automatic sealing means comprises a normally closed valve positioned in the fuel exit passage, while the vehicle includes means mounted thereto for receiving and retaining the tank during use, and which includes means for opening the normally closed valve.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 2 is an enlarged, cross-sectional view of one component of the preferred embodiment of the present invention taken along line 2—2 of FIG. 1;

FIG. 3 is a top view of the preferred embodiment illustrated in FIG. 2; and

FIG. 4 is a cross-sectional view of the preferred embodiment of the present invention illustrated in FIG. 2 and taken along line 4—4 thereof.

DETAILED DESCRIPTION OF THE PREFERRED EMBODIMENT

Figure 1:
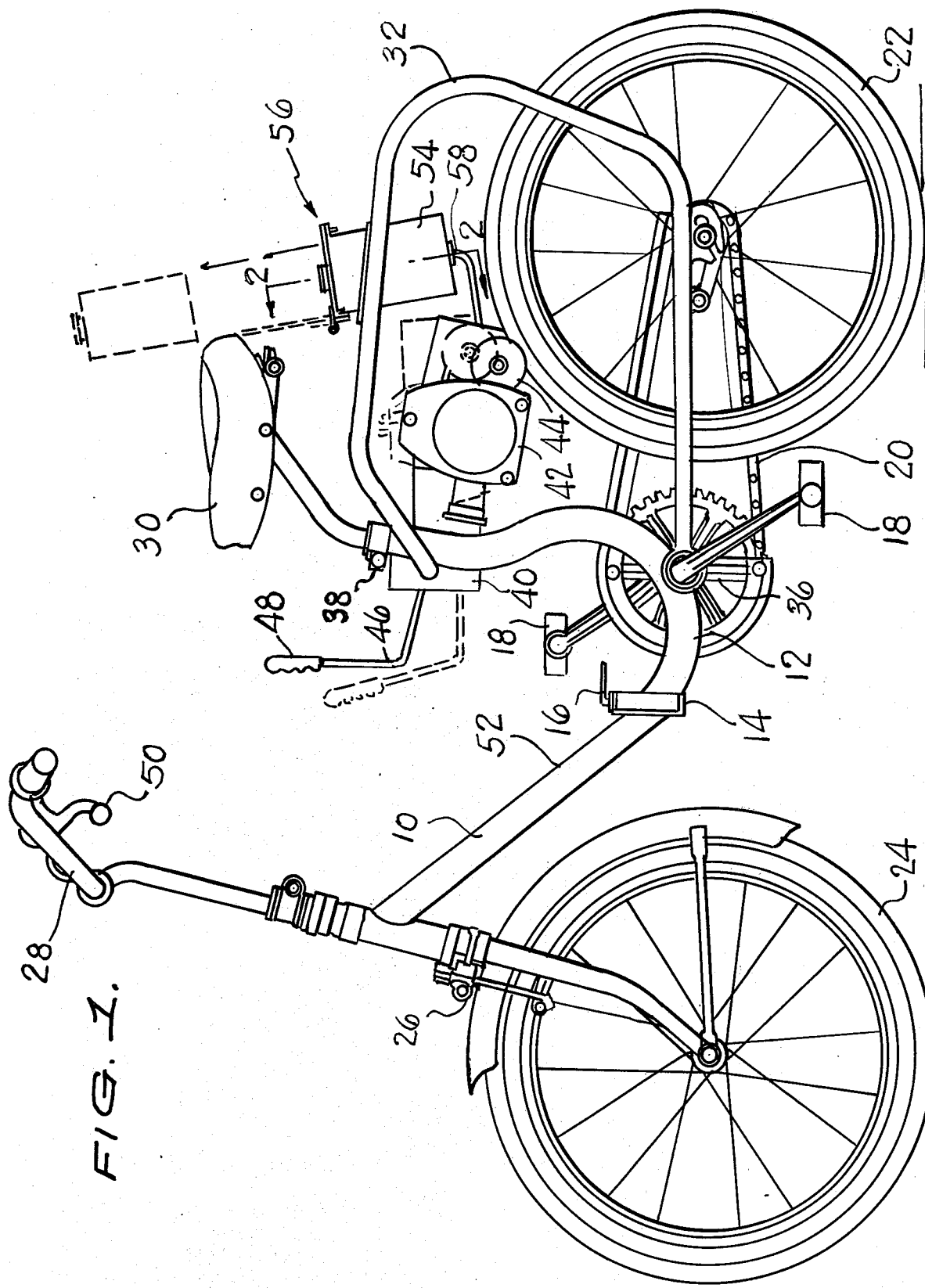
FIG. 1 is a side view in elevation of a preferred embodiment of the present invention.

Referring now to the drawings, wherein like reference numerals indicate identical or corresponding parts throughout the several views, and more particularly to FIG. 1 thereof, there is illustrated in side elevation a preferred embodiment of the motorized bicycle of the present invention which incorporates a removable fuel tank.

The bicycle illustrated in FIG. 1 is seen to include a front frame 10 and a rear frame 12 which are interconnected by a hinge 14 for rendering the bicycle collapsible, as is conventional. The hinge 14 includes a hinge lock 16 for locking same in its open position. The bicycle of FIG. 1 may therefore be folded in half for storage or handling.

The bicycle includes conventional pedals 18 and a chain drive 20 for the rear wheel 22. The rear wheel 22 preferably includes a conventional coaster brake (not shown), while the braking of the front wheel 24 may be controlled by a caliper type brake 26 which is, in turn, actuated by a conventional handle mounted on the handle bars 28.

Extending from the upper portion of rear frame 12 is a conventional seat assembly 30. An auxiliary double support frame 32, 34 extends from the pedal pivot 36 to a point just below the seat shaft adjustment bracket 38.

Mounted about the upper part of rear frame 12 is a motor support housing 40 for supporting a small (e.g. 1.5 hp) gasoline motor 42. Coupled to the output of motor 42 is a spool 44 that selectively engages the rear wheel 22 for driving same. The spool 44 may be selectively engaged with the rear wheel 22 by means of a clutch 46 having a handle 48 for pivoting the motor 42 and spool 44 from its solid to dotted line positions, and vice versa. The solid line position of the motor 42 and spool 44 indicates engagement of the spool 44 with the rear wheel 22, while the dotted line position illustrated in FIG. 1 indicates its disengaged position.

Also provided on handle bar 28 is a throttle 50 for controlling the speed of the engine 42 via a control line 52.

Mounted between the auxiliary frame members 32 and 34 is a housing 54 for containing a removable fuel tank which is indicated generally by reference numeral 56 and whose structure and operation will be described in greater detail hereinbelow. Note that a fuel line 58 extends from the bottom of housing 54 to the motor 42 for delivering fuel from the tank 56.

FIGS. 2 through 4 illustrate the details of the structure of the fuel tank and housing. The housing 54 comprises a substantially planar bottom wall 60 from which are integrally formed a pair of parallel, spaced side walls 62 and 64. Also integrally formed with the side walls 62 and 64 and bottom wall 60 are a front wall 66 and a rear wall 68. A thin, elongated top cover 70 is hinged as at 72 to the top portion of the rear wall 68 of housing 54. A selective retaining means 74 is provided at the distal end of top cover 70 for holding the cover in a closed condition when desired.

On the side walls 62 and 64 of housing 54 are affixed a pair of L-shaped mounting flanges 76 and 78 which serve as the means for securing the housing 54 to the frame members 32 and 34, respectively. The flanges 76 and 78 may be secured to frame members 32 and 34 by any conventional means, such as welding, adhesives, or the like.

Centered in and extending through the bottom wall 60 of the housing 54 is a valve receiving support member 80, the structure and function of which will be described in greater detail hereinafter.

Still with reference to FIGS. 2 through 4, the gas container or tank 56 is seen to include a bottom wall 82 and a pair of side walls 84 and 86 extending integrally therefrom. The tank 56 also includes a front wall 88, a rear wall 90, and a top wall 92. Formed in the top wall 92 is a standard, screw-type of filler cap 94 which permits the tank 56 to be filled with gasoline or other fuel.

A pair of flanges 99 and 101 extend from the top wall 92 of tank 56 and are adapted to pivotally receive a pair of support members 98 and 100, respectively. Connected to the distal ends of support members 98 and 100 is a carrying handle 96 which, in addition to serving as a convenient means for supporting and carrying the fuel tank 56, serves a distinct important function to be described in greater detail hereinbelow. Mounted adjacent the flange 101 is a spring 102 which normally biases the handle 96 in the dotted line position indicated in FIG. 4.

The top wall 92 of gasoline tank 56 has a handle-receiving depression 104 formed along one edge thereof. The depressed portion 104 of the top wall 92 serves as an accident-preventing recess for a normally closed air vent valve 106 which is centrally positioned in the recess 104. The air vent valve 106 is of conventional construction and may be opened by applying pressure to its uppermost projection 108.

Centrally positioned in the bottom wall 82 of the fuel tank 56 is an automatically actuated fuel line valve which is indicated generally in FIGS. 2 and 4 by reference numeral 110. The fuel valve 110 includes an annular valve housing 112 within which is positioned a vertically movable plunger 114. Plunger 114 is normally biased downwardly by a spring member 116 so that the plunger 114 seats in the housing 112 to close the fuel passage 118 which leads from the interior of tank 56 to the fuel line 58.

Referring particularly to FIG. 4, the valve receiving means and support 80 is recessed so as to receive the annular valve housing 112 therein. Centrally and rigidly positioned within the support 80 is a stop member 120 which is engaged by the plunger 114 upon insertion of the annular valve housing 112 into support 80. The stop member 120 serves to move the plunger 114 upwardly as viewed in FIG. 4 against the bias supplied by spring 116 for opening the fuel valve 110 and thereby permitting the fuel in tank 56 to flow through valve 110, support 80, and into fuel line 58 to the motor of the bicycle.

As may be appreciated from the foregoing, when the tank 56 is removed from the housing 54, the spring 116 automatically biases the plunger 114 downwardly so as to seal the fuel exit passage 118 and thereby prevent any leakage of fuel from the tank 56. This further ensures that no fuel will reach the fuel line 58 such that when the tank 56 is removed from housing 54 safe transport of the bicycle is ensured. Note that a base member or flange 122 is provided which extends downwardly from the bottom wall 82 of fuel tank 56 for protecting the valve 110 against accidental actuation. In effect, wall 122 serves to recess the valve 110 in much the same fashion that depression 104 recessed the air vent valve 106, as pointed out above.

When the fuel tank 56 is inserted within housing 54 as illustrated, the fuel passage 118 is opened. In order for gasoline to flow, however, the handle 96 must be placed in its solid line position illustrated in FIG. 4, against the force of spring 102, and the cover 70 of the housing 54 must be secured, as by closure means 74, to retain the handle 96 against the projection 108 of the air vent valve 106. This vents the tank 56 to ambient atmosphere to permit escape of gas vapor as well as fuel flow.

By virtue of the foregoing, it is seen that there has been provided a motorized bicycle which is rendered easily and safely transportable by virtue of a removable, self-sealing gasoline or fuel tank. This feature permits the motor vehicle to be safely transported on, for example, common carrier transportation, where prior transport may have been prohibited by regulation.

Obviously, numerous modifications and variations of the present invention are possible in light of the above teachings. For example, the removable self-sealing fuel tank may be applied to any engine driven machine, such as a lawn mower, snow blower, chain saw, or the like, with the same beneficial effects. It is therefore to be understood that within the scope of the appended claims the invention may be practiced otherwise than as specifically described herein.

I claim as my invention:

1. In combination with a motorized bicycle having a frame, a gasoline motor mounted on said frame, a drive spool rotated by said motor, and control means for selectively engaging said drive spool with a wheel of the bicycle, the improvement which comprises:
  a gasoline tank which is selectively removable from said bicycle so as to render said bicycle, when removed therefrom, devoid of gasoline tanks for facilitating safe transport of same; and
  housing means mounted on said frame for selectively retaining or releasing said gasoline tank and including a fuel line extending therefrom to said gasoline motor, and means for placing said fuel line in fluid communication with said gasoline tank only upon insertion of said tank into said housing means.

2. The combination as set forth in claim 1, wherein said gasoline tank includes a fuel exit passage formed in the lower portion thereof for delivering fuel from said tank to said fuel line, and means positioned in said fuel exit passage for permitting fuel flow therethrough only upon the positioning of said tank in said housing means.

3. The combination as set forth in claim 2, wherein said means for permitting fuel flow through said fuel exit passage comprises a normally closed valve which opens upon mating with said means for placing said fuel line in fluid communication with said gasoline tank.

4. The combination as set forth in claim 3, wherein said normally closed valve comprises a valve housing having a valve seat, a movable plunger positioned within said valve housing, and a spring for biasing said plunger towards said valve seat, and wherein said means for placing said fuel line in fluid communication with said gasoline tank comprises an actuating shaft fixedly positioned in the lower portion of said housing means for moving said plunger away from said valve seat when said tank is positioned within said housing means.

5. The combination as set forth in claim 4, further comprising a base member extending downwardly from the bottom wall of said gasoline tank and peripherally enclosing said valve.

6. In combination with a motorized bicycle having a frame, a gasoline motor mounted on said frame, a drive spool rotated by said motor, and control means for selectively engaging said drive spool with a wheel of the bicycle, the improvement which comprises:
  a gasoline tank which is selectively removable from said bicycle; and
  housing means mounted on said frame for selectively retaining or releasing said gasoline tank;
  wherein said gasoline tank further includes a normally closed air vent valve positioned in the top wall thereof, and means for automatically opening said air vent valve when said tank is secured in said housing means.

7. The combination as set forth in claim 6, wherein said means for automatically opening said air vent valve comprises a lever pivotally mounted to the outer top wall of said tank, and a tank retaining cover pivotally mounted on said housing means for securing said lever against said air vent valve when closed while retaining said tank in said housing means.

8. The combination as set forth in claim 7, wherein said lever comprises a carrying handle for said gasoline tank, and further including a spring for normally biasing said handle out of engagement with said air vent valve.

9. For use in combination with an engine driven machine having suitable housing means with a cover and cover-retaining means, a unitary gasoline tank having a fuel exit passage for directing fuel from said tank to said engine when the tank is in operating position, said tank being readily separable from said machine so that, when said tank is removed from said machine, the latter is devoid of gasoline tanks and is thereby rendered safe for transport, said tank including vent means in normally closed position, a handle with means for cooperating with the cover, when the latter is closed, to open the vent means and means for automatically sealing said fuel exit passage when the tank is removed from said machine, the housing means, the cover and the cover-retaining means comprising the only structure which secures the tank when the latter is in operating position.

10. The tank as set forth in claim 9, wherein said automatic sealing means comprises a normally closed valve positioned in said fuel exit passage.

11. The tank as set forth in claim 10, wherein the housing for the engine driven machine includes means for opening said normally closed valve.

12. Apparatus for use with a machine driven by a liquid fuel powered engine, which comprises:
  a unitary liquid fuel container serving as a primary fuel tank for said engine and without which the machine is devoid of a fuel tank;
  housing means, with a cover and cover-retaining means, mounted on said machine for receiving and retaining said liquid fuel container during use;
  said fuel container being readily separable from said housing means and including a fuel exit passage, valve means for automatically sealing said exit passage when said container is removed from said housing means, and handle means coupled to the top of said container for facilitating removal and carrying of said container, the handle means being secured in an inoperative position by the cover when the fuel container is in the housing means and the cover is retained by the cover-retaining means.

* * * * *